Sept. 30, 1924.  1,510,108

A. RODRIGUEZ ET AL

OILING SYSTEM FOR DEEP WELL CENTRIFUGAL PUMPS

Filed Oct. 8, 1921

INVENTORS

Abraham Rodriguez
Henry Gustavson
John A. ...

BY

ATTORNEY

Patented Sept. 30, 1924.

1,510,108

UNITED STATES PATENT OFFICE.

ABRAHAM RODRIGUEZ AND HENRY GUSTAVSON, OF SAN JOSE, CALIFORNIA, ASSIGNORS TO MILTON G. MOENNING AND DOUGLAS C. HOWARD, BOTH OF SAN JOSE, CALIFORNIA.

OILING SYSTEM FOR DEEP-WELL CENTRIFUGAL PUMPS.

Application filed October 8, 1921. Serial No. 506,501.

*To all whom it may concern:*

Be it known that we, ABRAHAM RODRIGUEZ and HENRY GUSTAVSON, citizens of the United States, and residents of San Jose, in the county of Santa Clara and State of California, have invented certain new and useful Improvements in Oiling Systems for Deep-Well Centrifugal Pumps, of which the following is a specification.

It is the object of our invention to provide a pump mechanism whereby the driving shaft is effectively maintained in perfect alignment; in which suitable bearings are provided for supporting the shaft; in which means is provided for effectively preventing the entrance of water to certain sections of the shaft, and in which a new and novel means of lubricating the shaft is provided.

In the drawing,—

Figure 1:
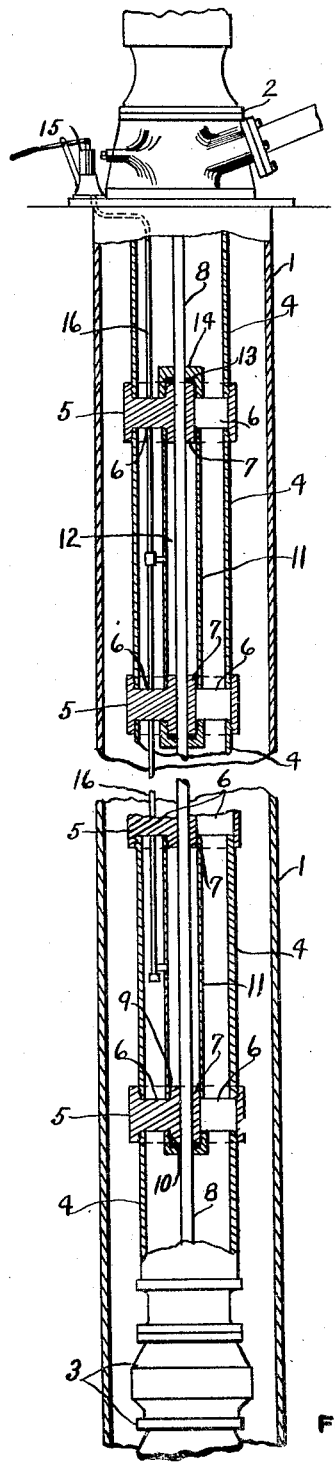
Figure 1 is a sectional view through a pump embodying our invention.
Figure 2:
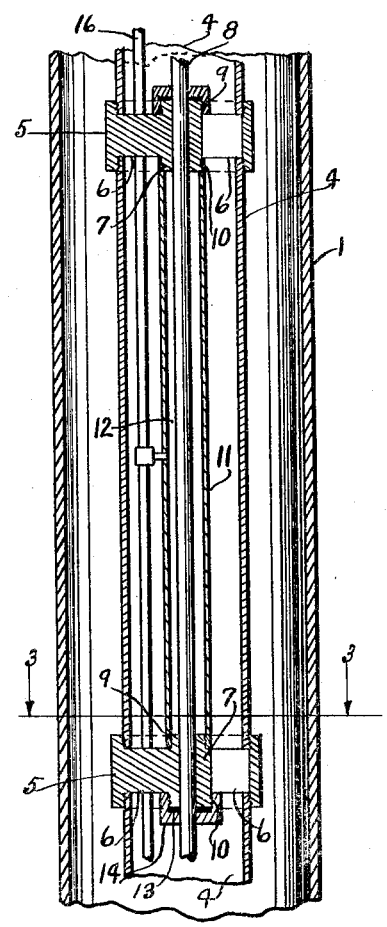
Figure 2 is an enlarged detail of a lubricated section of the pump.
Figure 3:
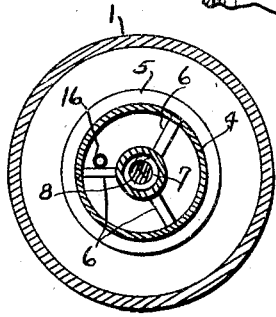
Figure 3 is a section on 3—3 of Figure 2.

Referring more particularly to the drawing, 1 indicates a well casing, 2 a pump head mounted thereover, 3 a pump bowl supported in the well by discharge casing sections 4.

At 5—5—5 are shown couplings each coupling being internally threaded at each end to engage the end of a discharge casing section as shown. Each coupling carries a number of webs as 6 supporting a bearing 7 for pump shaft 8, the bearing being externally threaded as at 9 and 10.

In assembling this pump a shaft enclosing tube 11 is screwed onto the opposing ends 9—10 of the alternate pairs of bearings to form chambers as 12. The shaft 8 is left entirely exposed to the water in the well in the portions between said chambers 12. The exposed threaded ends 9—10 of the bearings are in each case fitted with suitable washers as at 13 and cap members 14.

At 15 is indicated a grease pump connected by conduits 16 to the several chambers 12 whereby the said chambers may be kept full of lubricant.

In its practical application the pump is constructed and assembled as above set forth and the several chambers 12 filled with lubricant by operating pump 15.

The construction of the bearings fitted with washers 13 and caps 14, together with the pressure of the lubricant working out of chamber 12 through bearings 7 to said washers and caps, will effectually lubricate the two bearings forming the ends of chamber 12 and prevent the entrance of errosive materials thereto.

Since each pair of bearings is effectually lubricated as above set forth the shaft section, as 17 between the pairs of bearings may be left entirely exposed to the water in the well thereby reducing both labor and material in the pump construction.

It is to be understood, of course, that while we have herein shown and described one particular embodiment of our invention, changes in form, construction, and method of operation may be made within the scope of the appended claim.

We claim:—

In combination, a deepwell pump driving shaft, spaced bearings throughout the length thereof, each bearing being similarly threaded at both ends and provided with radially extending webs supporting a coupling similarly threaded at both ends to support a continuous discharge casing, shaft enclosing tubes connecting alternate pairs of bearings by threaded engagement therewith, a packing arranged on the disengaged end of each bearing, and means for filling said tubes with lubricant.

ABRAHAM RODRIGUEZ.
HENRY GUSTAVSON.